US012764742B2

(12) United States Patent
Maleki et al.

(10) Patent No.: US 12,764,742 B2
(45) Date of Patent: Oct. 13, 2026

(54) SKIPPED CHANNEL BUFFERING

(71) Applicant: Telefonaktiebolaget LM Ericsson (PUBL), Stockholm (SE)

(72) Inventors: Sina Maleki, Malmö (SE); Joao Vieira, Hjärup (SE); Muris Sarajlic, Malmö (SE); Ilmiawan Shubhi, Malmö (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 357 days.

(21) Appl. No.: 18/567,287

(22) PCT Filed: Jun. 7, 2021

(86) PCT No.: PCT/EP2021/065117
§ 371 (c)(1),
(2) Date: Dec. 5, 2023

(87) PCT Pub. No.: WO2022/258134
PCT Pub. Date: Dec. 15, 2022

(65) Prior Publication Data
US 2024/0276492 A1 Aug. 15, 2024

(51) Int. Cl.
*H04W 72/1273* (2023.01)
*H04W 72/542* (2023.01)

(52) U.S. Cl.
CPC ..... *H04W 72/1273* (2013.01); *H04W 72/542* (2023.01)

(58) Field of Classification Search
CPC . H04W 16/28; H04W 52/0248; H04W 72/02; H04W 72/046; H04W 72/1273; H04W 72/542; H04B 7/0408
See application file for complete search history.

(56) References Cited

U.S. PATENT DOCUMENTS

2019/0281587 A1* 9/2019 Zhang ................... H04W 72/23
2020/0288479 A1* 9/2020 Xi ......................... H04L 5/0092
2020/0296697 A1* 9/2020 Hwang ............. H04W 74/0833
2020/0350957 A1* 11/2020 Zhou .................... H04B 7/0408
2021/0153239 A1* 5/2021 Bai ....................... H04L 69/324
2021/0227418 A1* 7/2021 Hwang ................. H04L 5/0057
(Continued)

OTHER PUBLICATIONS

3GPP TS 38.214 V16.3.0 (Sep. 2020) 3rd Generation Partnership Project; Technical Specification Group Radio Access Network; NR; Physical layer procedures for data (Release 16).
(Continued)

*Primary Examiner* — Benjamin H Elliott, IV
(74) *Attorney, Agent, or Firm* — Baker Botts L.L.P.

(57) ABSTRACT

This disclosure presents a method (600) of skipped channel buffering performed by a wireless device configured to receive downlink, DL, transmissions in multiple beams from a network node. The method (600) comprises monitoring (610) a beam scheduling of the network node and, based on the monitoring (610), determining (620) a probability that a current DL channel transmission is scheduled in a default beam. Responsive to the probability that the current DL channel transmission is scheduled in the default beam is at or below a scheduling threshold, skipping (630) buffering of DL channel transmissions in the default beam. A wireless device, a computer program product and a carrier are also disclosed.

16 Claims, 3 Drawing Sheets

(56) References Cited

U.S. PATENT DOCUMENTS

| | | | | |
|---|---|---|---|---|
| 2022/0217579 | A1* | 7/2022 | Seo | H04W 72/0446 |
| 2022/0225338 | A1* | 7/2022 | Zhu | H04B 7/06968 |
| 2022/0303960 | A1* | 9/2022 | Zhou | H04L 5/001 |
| 2022/0322227 | A1* | 10/2022 | Jacob Mathecken | H04W 52/0219 |
| 2023/0209532 | A1* | 6/2023 | Zhou | H04W 72/121 |
| 2023/0362968 | A1* | 11/2023 | Xi | H04W 72/53 |
| 2024/0276492 | A1* | 8/2024 | Maleki | H04B 7/0408 |
| 2024/0298324 | A1* | 9/2024 | Elshafie | H04L 5/0053 |

OTHER PUBLICATIONS

3GPP TSG RAN WG1 NR Ad-Hoc#2; Qingdao, P.R. China Jun. 27-30, 2017; Agenda Item: 5.1.3.3.1.2; Source: MediaTek Inc.; Title: Cross-Slot Scheduling for UE Power Saving (R1-1710838).

3GPP TSG RAN WG1 Meeting #90; Aug. 21-25, 2017; Prague, Czech Republic; Agenda Item: 6.1.3.5; Source: Qualcomm Incorporated; Title: UE Power Saving during Active State (R1-1713481).

PCT Notification of the International Search Report and the Written Opinion of the International Searching Authority, or the Declaration issued for International application No. PCT/EP2021/065117—Apr. 12, 2022.

* cited by examiner

SKIPPED CHANNEL BUFFERING

PRIORITY

This nonprovisional application is a U.S. National Stage Filing under 35 U.S.C. § 371 of International Patent Application Serial No. PCT/EP2021/065117 filed Jun. 7, 2021 and entitled "SKIPPED CHANNEL BUFFERING," which is hereby incorporated by reference in its entirety.

TECHNICAL FIELD

The present disclosure relates to channel buffering in a wireless communications network and more precisely to a selective skipping of channel buffering by a wireless device configured to receive downlink transmissions in multiple beams.

BACKGROUND

Within wireless communication systems, efficient use of the radio spectrum is increasingly important and several methods and technologies exist to allow for efficient spectrum sharing and (simultaneous) access by multiple users. Several multiple-access systems are defined by 3rd Generation Partnership Project, 3GPP e.g. Long Term Evolution, LTE, systems, LTE Advanced, LTE-A, systems using spectrum access technologies such as code division multiple access, CDMA, time division multiple access, TDMA, frequency division multiple access, FDMA, orthogonal frequency division multiple access, OFDMA, single-carrier frequency division multiple access, SC-FDMA, time division synchronous code division multiple access, TD-SCDMA etc.

New radio, NR or 5G NR. NR is an advancement to LTE and is designed to better support mobile broadband internet access by improving spectral efficiency, lowering costs, improving services etc. One key component in providing these advancements is the support of beamforming. Beamforming, or spatial filtering, is a signal processing technique used to directionally control signal transmission or reception. Beamforming comprises controlling elements of an antenna array such that e.g. signals at some angles experience constructive interference while signals at other angles experience destructive interference, effectively controlling the direction of a transmitted signal. The same technology may be applied on the receiver side, where the directivity of an antenna array may be controller by beamforming, i.e. defining a direction in which the receiver is most sensitive. Beamforming may be used simultaneously at both the transmitting and receiving ends in order to achieve spatial selectivity.

In order to e.g. increase throughput of a wireless communication systems, a base station is preferably configured to communicate using multiple beams. This means that a wireless device such as a User Equipment, UE, may have to receive some or all of these multiple beams in order to learn which beam that comprise data for the UE, e.g. a Physical Downlink Shared Channel, PDSCH. This may be addressed by beam scheduling, wherein a network indicates to the UE through which beams it will receive data. This may be communicated to the UE as a Transmission Configuration Indicator field, TCI-field, communicated on a Physical Downlink Control Channel, PDCCH. However, in order for the UE to receive the TCI-field, it may have to receive a number of beams and the TCI-field may very well be comprised in the same beams as the PDSCH which means that the UE may have to buffer beams which increases memory requirements, processing need and power consumption of the UE.

SUMMARY

It is in view of the above considerations and others that the various embodiments of this disclosure have been made. The present disclosure therefor recognizes the fact that there is a need for improvement of the existing art described above.

It is a general object of the embodiments described herein to provide a new type of method for channel buffering which is improved over the prior art and which eliminates or at least mitigates one or more of the drawbacks discussed above. More specifically, an object of the embodiments discussed in this disclosure, is to provide a method that can be run autonomously by a wireless device.

This general object has been addressed by the appended independent claims. Advantageous embodiments are defined in the appended dependent claims.

In a first aspect, a method of skipped channel buffering is presented. The method is performed by a wireless device configured to receive downlink, DL, transmissions in multiple beams from a network node. The method comprises monitoring a beam scheduling of the network node and, based on the monitoring, determining, a probability that a current DL channel transmission is scheduled in a default beam. The method further comprises, responsive to the probability that the current DL channel transmission is scheduled in the default beam is at or below a scheduling threshold, skipping buffering of DL channel transmissions in the default beam.

In one embodiment, the step of determining the probability that a current DL channel transmission is scheduled in a default beam is based on scheduling offsets of a series of historic DL channel transmissions. Scheduling offsets is a well-defined metric for specifying the difference between the default beam and a beam carrying the DL channel transmission. This allows for consistent and easily managed data sets for determining e.g. the probability that the current DL channel transmission is scheduled in the default beam.

In one embodiment, the step of determining the probability that a current DL channel transmission is scheduled in a default beam comprises calculating an average scheduling offset of the series of historic DL channel transmissions. An average scheduling offset provides a convenient measure to summarize statistic data and a memory size required to store an average value is far less than a memory size required to store all the scheduling offset data.

In one embodiment, the step of determining the probability that a current DL channel transmission is scheduled in a default beam comprises calculating a scheduling standard deviation of the scheduling offsets of the series of historic DL channel transmissions. A scheduling standard deviation provides a convenient measure to summarize statistic data and a memory size required to store a scheduling standard deviation value is far less than a memory size required to store all the scheduling offset data.

In one embodiment, the step of determining the probability that a current DL channel transmission is scheduled in a default beam comprises calculating a scheduling confidence interval having a confidence interval width based on the average scheduling offset and the scheduling standard deviation. A scheduling confidence interval provides a convenient measure to summarize statistic data and a memory size required to store a scheduling confidence interval is far less than a memory size required to store all the scheduling offset data.

In one embodiment, the method further comprises receiving, from the network node, a DL control transmission comprising an indication of a true scheduling offset. After the step of skipping buffering of DL channel transmissions in the default beam and responsive to the true scheduling offset indicating that the DL channel transmission is scheduled in the default beam, the method further comprises transmitting, to the network node, a negative acknowledgement, NACK, associated with the DL channel transmission scheduled in the default beam. This is beneficial since it allows the wireless device to still receive the data of the DL channel transmission that was scheduled in the un-buffered default beam.

In one embodiment, the method further comprises monitoring a signal quality of the default beam and responsive to the signal quality being below a signal quality threshold, skipping buffering of DL channel transmissions in the default beam. The signal quality threshold is a threshold that relates to at least one of Signal-to-noise ratio, SNR, Signal-to-interference-plus-noise ratio, SINR, carrier-to-noise, C/N, carrier-to-interference ratio, CIR, etc. This is beneficial as the signal quality in many cases is related to the beam scheduling and monitoring the signal quality will increase the reliability of the decision to skip buffering of the DL channel transmission in the default beam. All in all, further increasing power savings of the wireless device.

In one embodiment, the DL channel transmission is transmitted on a Physical Downlink Shared Channel, PDSCH.

In one embodiment, the beam scheduling is transmitted on a Physical Downlink Control Channel, PDCCH.

In one embodiment, the method further comprises, responsive to the network node informing the wireless device of a minimum scheduling offset being greater than zero, skipping buffering of DL channel transmission in the default beam. This is beneficial as it provides additional reliability in the decision to skip buffering of the DL channel transmission in the default beam.

In one embodiment, the minimum scheduling offset is indicated in a start symbol and length, SLIV, field transmitted by the network node on the PDCCH.

In one embodiment, the scheduling threshold is determined based on decoding time required by the wireless device to decode the beam scheduling of the network node. This is beneficial as it provides a measure of the minimum offset required for skipped buffering of DL channel transmissions.

In one embodiment, the scheduling threshold corresponds to a probability of 10 percent or less.

In a second aspect, a wireless device is presented. The wireless device may comprise a radio interface and one or more controllers. The wireless device is configured to perform the method according to the first aspect. In one implementation, the one or more controllers are configured to perform the method according to the first aspect.

In one embodiment, the wireless device is a New Radio, NR, device or later generations thereof.

In a third aspect, computer program product is presented. The computer program comprises instructions which, when executed on at least one processor of wireless device (such as UE), cause the at least one processor to carry out the method according to the first aspect.

In a fourth aspect, a carrier comprising the computer program product of the third aspect is presented. The carrier may for example be one of an electronic signal, an optical signal, a radio signal, or a computer readable storage medium.

BRIEF DESCRIPTION OF THE DRAWINGS

These and other aspects, features and advantages will be apparent and elucidated from the following description of various embodiments; references being made to the appended diagrammatical drawings which illustrate non-limiting examples of how the concept can be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

The term "coupled" is defined as connected, although not necessarily directly, and not necessarily mechanically. Two or more items that are "coupled" may be integral with each other. The terms "a" and "an" are defined as one or more unless this disclosure explicitly requires otherwise. The terms "substantially," "approximately," and "about" are defined as largely, but not necessarily wholly what is specified, as understood by a person of ordinary skill in the art. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method that "comprises," "has," "includes" or "contains" one or more steps possesses those one or more steps, but is not limited to possessing only those one or more steps.

Embodiment of the present disclosure will be given mainly with reference to wireless devices such as NR devices. However, it should be emphasized that this is for efficiency of disclosure and that working embodiments with other wireless devices, future and present, are also within the scope of the embodiments discussed throughout this disclosure. The term network as used in this disclosure is to mean a communications network in general. Information or data received from the network is to comprise any information origination from any point within the network that is relayed to e.g. a wireless device.

Figure 1:
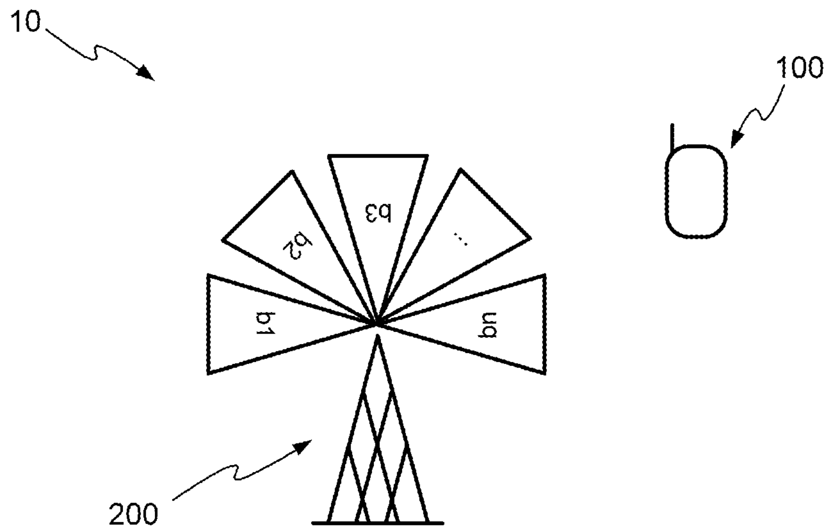
FIG. 1 is a wireless communication systems according to some embodiments.

With reference to FIG. 1, in a wireless communication systems 10, a wireless device embodied as a UE 100 may be configured to receive downlink, DL, data in a DL channel transmission in at least one of multiple beams b1, b2, b3, . . . , bn from a network node 200, e.g. a base station 200. The DL data may, in some embodiments, be provided on a Physical Downlink Shared Channel, PDSCH. Beam scheduling information, indicting in which beam b1, b2, b3, . . . , bn the PDSCH carrying the DL data for the UE, is provided to the UE on a Control Channel. In some embodiments it may be provided on a Physical Downlink Control Channel, PDCCH. The information regarding which beam b1, b2, b3, . . . , bn that comprises the DL data is generally comprised in a Control Information field, in some embodiments a DL Control Information, DCI, field.

The PDCCH reception by the UE is generally carried by control resource sets, CORESETs, which are configured by higher layer. The configuration information comprises parameters related to the detection of the PDCCH. These physical parameters may comprise e.g. a number of OFDM symbols, a configured frequency resource etc. The actual beam indication may be based on a configuration and downlink signaling of Transmission Configuration Indication, TCI, states. Each TCI state generally includes, among other things, information about a reference signal and by associating the PDCCH with a certain TCI, the network effectively informs the UE 100 that it can assume that the PDSCH is transmitted using the same spatial filter as the reference signal associated with that TCI. However, for a specific CORESET, the used TCI state may either be configured by a Radio Resource Controller, RRC, or by RRC plus MAC Control Element, CE. Consequently, the DCI is not used to select the TCI state and the beam for PDCCH cannot be changed as fast as the PDSCH beam since switching is done by MAC CE only.

The signaling of the PDCCH, the configuration of the DCI and TCI fields respectively are, after digestion of this disclosure and e.g. the 3GPP publication TS 38.321, known to the skilled person.

Figure 2A:
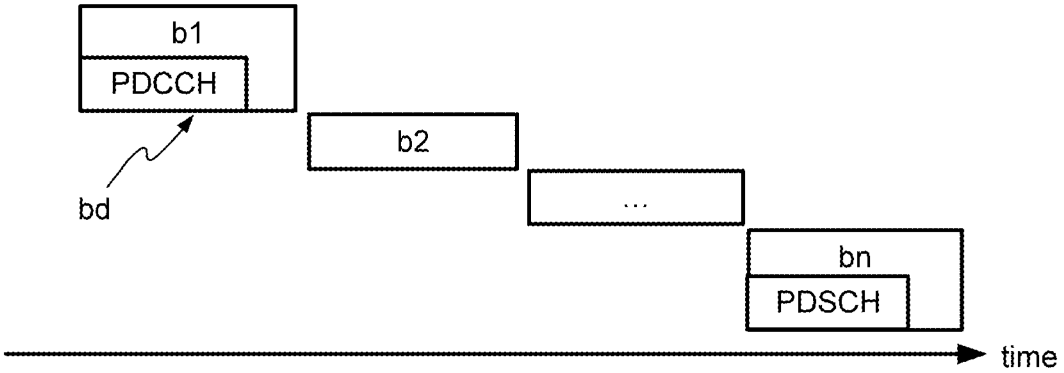
FIGS. 2*a*-*b* are schematic time series graphs of beam transmissions according to some embodiments.

Turning now to FIG. 2*a*, illustrating a time series plot of how multiple beams b1, b2, b3, . . . , bn are transmitted. In FIG. 2*a*, the PDCCH is comprised in the first beam b1 and the PDSCH is comprised in the last beam, the n:th beam bn. The beam comprising the PDCCH is defined as a default beam bd, and in embodiments where more than one PDCCH is transmitted to the UE 100, the default beam bd is the beam comprising the PDCCH with a lower CORESET index—as is known from e.g. the 3GPP publication TS 38.321, version 16.4.0 section 6.1. In the example of FIG. 2*a*, the time between the default beam bd and the PDSCH is substantially the longest possible. In this example, the UE has ample time to decode the PDCCH, learn that the PDSCH is scheduled in the n:th beam and thereafter receive the PDSCH comprised n:th beam.

Figure 2B:
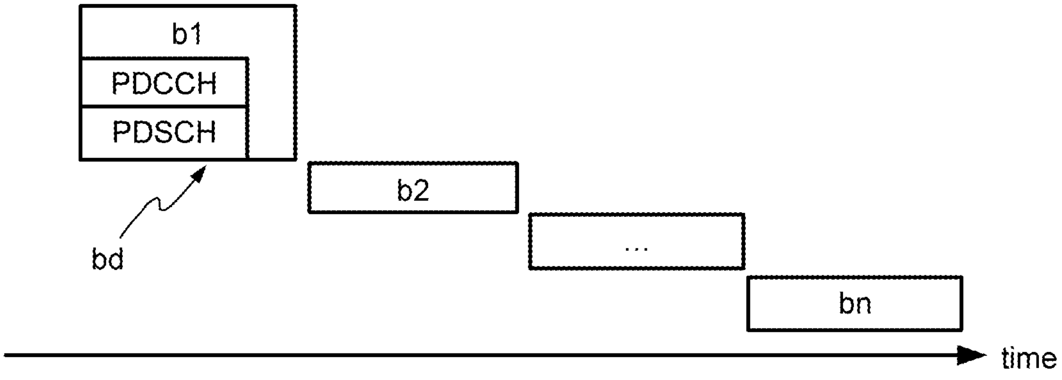

However, as illustrated in FIG. 2*b*, the PDSCH may very well be comprised in the default beam bd, illustrated as the first beam b1 in FIG. 2*b*. In this case, the UE 100 will not have sufficient time to decode the PDCCH and thereafter receive the PDSCH in the same beam. This requires the UE 100 to buffer the PDSCH of the default beam bd, and the PDSCH of any consecutive beam, until the PDCCH has been received, decoded and analyzed to determine the location of the PDSCH. The buffering of PDSCH in multiple beams consumes power and memory of the UE 100 as the channel/signal of more than one beam has to be received and stored. The inventors behind this disclosure have invented a method, as explained herein, which makes it possible to avoid buffering some of the beams for the determination of the intended/scheduled PDSCH and thereby saving battery and memory of the UE 100.

In order for the UE 100 to decide whether to buffer or not to buffer the default beam bd for PDSCH reception may be reduced to a priori knowledge about a scheduling offset being larger than a certain value. In the following, a number of methods and mechanisms with which the UE 100 can acquire the a priori knowledge about the scheduling offset will be explained.

Figure 3:
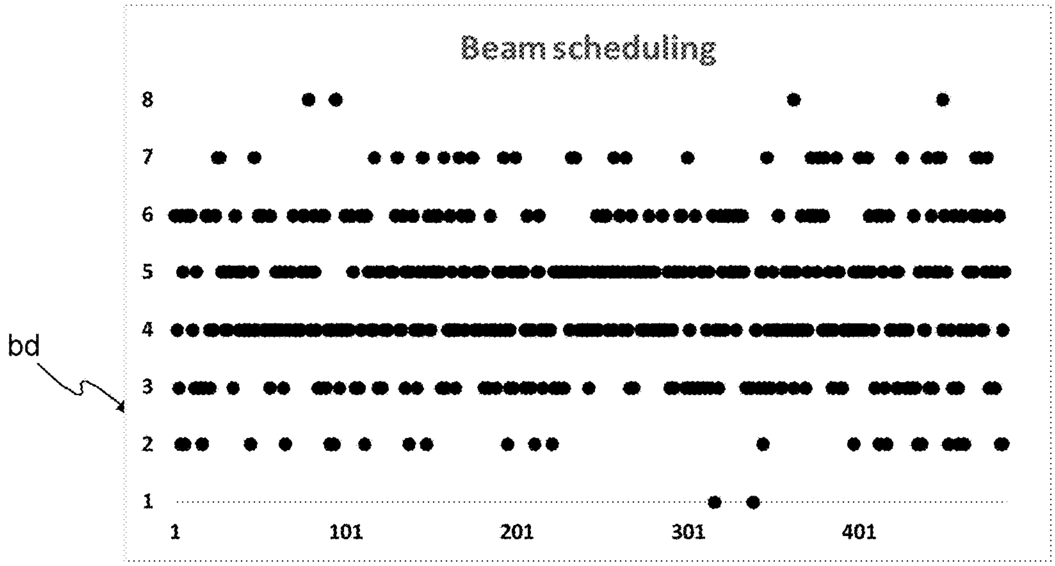
FIG. 3 is a plot of beam scheduling according to some embodiments.

In FIG. 3, a time series plot of beam scheduling across 8 beams is illustrated for 512 frames. Assuming that the first beam b1 is the default beam bd and beam 2 to 8 are consecutive to the default beam bd in numerical order, it is possible to, based on the data presented in FIG. 3, determine a probability p(bd) that the next PDSCH will be scheduled in the default beam bd. Based on this probability p(bd) the UE 100 can decide to skip buffering of the default beam bd for PDSCH detection/reception if the determined probability p(bd) is sufficiently low.

By looking to historic beam scheduling data, the inventors have realized that it is possible for the UE to determine the probability of the next PDSCH being scheduled in a specific beam, particularly the default beam bd. The historic beam scheduling data may be analyzed in a number of different ways. A series of data may be described by its mean p and standard deviation a. These variables are the true mathematical variable and these may, in one embodiment be estimated by an estimated mean $\bar{x}$ and an estimated standard deviation s. These estimations are determined for a number n of historic beam scheduling data x and may be described by Eqn. 1 and 2 below:

$$\bar{x} = \frac{1}{n}\Sigma_{i=1}^{n} x_i \quad \text{Eqn. 1}$$

$$s = \sqrt{\frac{1}{n}\Sigma_{i=1}^{n}(x_i - \bar{x})^2} \quad \text{Eqn. 2}$$

According to the central limit theorem, any number of random data, when added together, will converge to a normal distribution, also known as the Gauss distribution or a bell curve. A normal distribution is characterized by its mean p and standard deviation a and has a probability density function $f(x)$ according to Eqn. 3 below:

$$f(x) = \frac{1}{\sigma\sqrt{2\pi}} e^{-\frac{1}{2}\left(\frac{x-\mu}{\sigma}\right)^2} \quad \text{Eqn. 3}$$

Given a normal distribution $f(x)$, the probability that a random variable, in our case a beam, is at or below a number x is determined by the cumulative distribution function F(x) as described by Eqn. 2 below:

$$F(x) = \frac{1}{2}\left[1 + \text{erf}\left(\frac{x-\mu}{\sigma\sqrt{2}}\right)\right] \quad \text{Eqn. 4}$$

where erf is the error function according to Eqn. 5:

$$\text{erf}(x) = \frac{2}{\sqrt{\pi}}\int_0^x e^{-t^2}dt \quad \text{Eqn. 5}$$

Based on the above equations, it is possible to determine the probability that a coming PDSCH will be scheduled in a specific beam.

Notice that it is also possible the UE may have a profile of certain base stations or a given cell, e.g., in NR, the NR Cell Global Identity Characteristics (NCGI) may be used, which includes the gNb ID and Cell ID, or Global RAN Node ID defined in TS 38.413 section 9.2.6.1 can be used. Therefore, the UE may learn the specific scheduling behavior of some base stations, as the scheduling algorithms of different base stations may differ. The UE may also be configured to use such information to further identify the probability that a coming PDSCH will be scheduled in a specific beam with some of the probability functions. Alternatively, the UE may be configured modify some of the parameters of the normal distribution, e.g., the mean and/or variance values may be biased towards some of the beams. Furthermore, the parameters of the normal distribution may be further modified based on other factors, e.g., channel qualities, Signal-to-noise ratio, SNR, Signal-to-interference-plus-noise ratio, SINR, carrier-to-noise, C/N, carrier-to-interference ratio, CIR, etc. In some cases, a probability distribution may not be needed, as if the history observations are large enough, the UE can directly estimate the probability of which beam is used based on the historical data and use it as approximation of the true probability.

Figure 4:
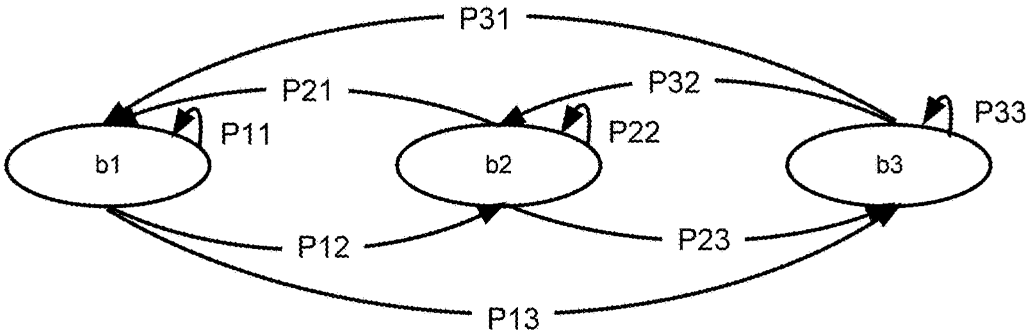
FIG. 4 is a state diagram of beam scheduling according to some embodiments.

The above embodiment is based on beam scheduling data indicating which beam historic PDSCH was scheduled in. In an alternative, or additional embodiment, the historic beam scheduling data is processed to describe the relationship between the beams of two adjacent PDSCH. This processed data is used to describe a Markov chain of the beam scheduling. This may be done by determining, based on the processed data, transition probabilities from a first beam to a second beam. This is illustrated in FIG. 4 in an example with three beams b1, b2, b3. In FIG. 4, the probability that, given a current PDSCH is scheduled in the third beam b3, the next PDSCH will be scheduled in the first beam b1 is denoted P31. Correspondingly, the probability that, given a current PDSCH is scheduled in the second beam b2, the next PDSCH will be scheduled in the third beam b3 is denoted P23 and so on describing a total of nine transition probabilities. The number of transition probabilities will be equal to the number of states squared. It should be noted that the number transitions used may be reduced by e.g. just determining and storing transitions from each beam to the default beam bd, or to beams proximal to the default beam bd.

The number n of historic beam scheduling data, i.e. the number of data points each describing a beam scheduling of a PDSCH, may be a predetermined number of data points n. In some embodiments, the number n of historic beam scheduling data is adaptive and is determined based on the estimated standard deviation s of the number n of historic beam scheduling data. If the estimated standard deviation s (with or without bias) is above a first spread threshold, the number n of historic beam scheduling data is increased, and if the estimated standard deviation s (with or without bias) is below a second spread threshold, the number n of historic beam scheduling data is decreased. The first spread threshold is equal to or greater than the second spread threshold. In a further embodiment, a confidence interval CI of the estimated mean $\bar{x}$ is calculated, and if said confidence interval CI is greater than a first confidence interval CI threshold, the number n of historic beam scheduling data is increased. If said confidence interval CI is smaller than a second confidence interval threshold, the number n of historic beam scheduling data is increased. The first confidence interval CI threshold is equal to or greater than the second confidence interval threshold. The confidence interval CI may be calculated in a number of different ways, and one example is given in Eqn. 6 below:

$$CI = \bar{x} \pm z^* \cdot \frac{s}{\sqrt{n}} \quad \text{Eqn. 6}$$

In Eqn. 6, the z* variable is a tabulated value usually found in tables. z* is based on degrees of freedom and the tail, i.e. the outer percentiles, of a probability distribution. Assuming a normal distribution and a 99% confidence interval CI, z* is approximately 2.58.

Figure 5:
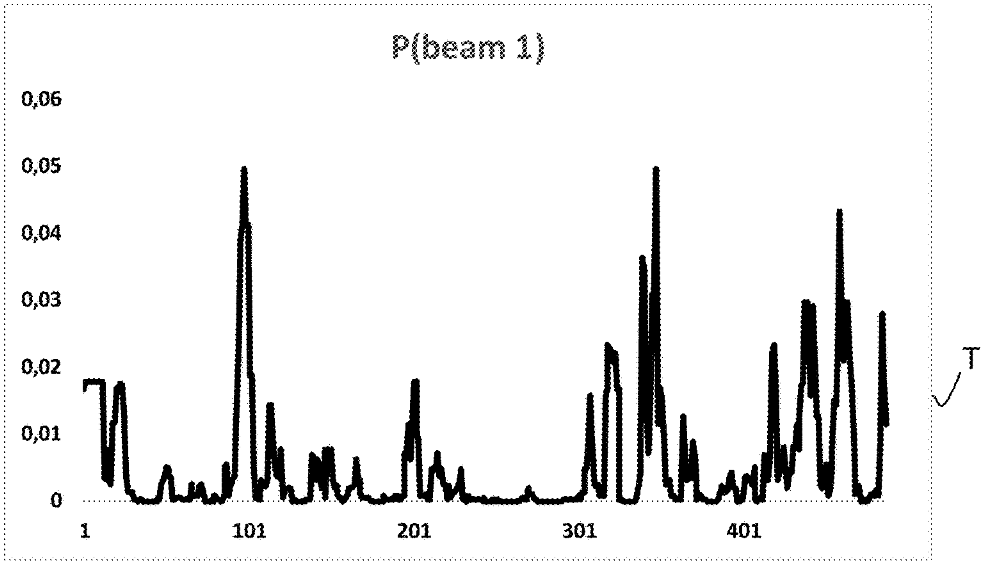
FIG. 5 is a probability plot of beam scheduling according to some embodiments.

As previously mentioned, the inventors have realized that the buffering of the default beam bd may be skipped if the probability of the next PDSCH is scheduled in the default beam is sufficiently low. This illustrated in FIG. 5 where, based on the simulated data of FIG. 3, the probability, based on the latest ten historic beam scheduling data, i.e. the number n of historic beam scheduling data is 10, that the next PDSCH will be scheduled in the first beam is plotted. It is assumed that the first beam is the default beam bd. In FIG. 5, a dotted line illustrates a scheduling threshold T which is used to determine if the PDSCH of default beam bd is to be buffered or not. If the probability is below the scheduling threshold T, buffering the default beam bd for PDSCH reception will be skipped. That is to say, the probability that the PDSCH will be transmitted as part of the default beam bd is sufficiently low. In FIG. 5, the scheduling threshold T is illustrated at a level of approximately 10%, this means that if the probability that the next PDSCH will be scheduled in the default beam bd is 10% or lower, buffering of the default beam bd for PDSCH reception will be skipped. The illustrated level of the scheduling threshold T of FIG. 5 is for illustrative purposes only and should not be considered limiting to general embodiments of this disclosure, however, specific embodiments wherein the scheduling threshold Tis set to 10% are possible.

It should be appreciated that, as the decision to skip buffering of the default beam bd for PDSCH reception is based on statistics, there is a risk of the UE 100 missing a PDSCH. If a PDSCH is not received, the UE 100 will signal a negative acknowledgement, NACK, to the base station 200 and the base station 200 will retransmit the missed PDSCH. The process of transmitting the NACK, receiving an additional PDCCH and PDSCH will consume additional power of the UE. This additional power may be used to determine the level of the scheduling threshold T. By comparing the additional power associated with a PDSCH NACK to the power saving associated with not buffering one PDSCH in one default beam bd, the scheduling threshold T may be determined such that, on average, the power consumption of the UE will be reduced. Further to this, the scheduling threshold T may be determined based on a time it takes for the UE to decode the PDCCH.

In one embodiment, the scheduling threshold T is determined based on relative UE power consumption numbers presented in 3GPP TR 38.840 V16.0.0. To exemplify, UE deep sleep is defined as 1, and PDCCH with buffering is 100 i.e. 100 times higher power consumption than UE deep sleep. If buffering is skipped, the relative power consumption is 70, i.e. a 30% saving. The transmission of a NACK is 250 times higher than UE deep sleep at an output power of 0 dBm, which is increased to 700 times higher than UE deep sleep at an output power of 20 dBm. In order to essentially always save power, the scheduling threshold T may have to be sufficiently low to save power also at 20 dBm output power, which would place it at about 4%. If however, the UE is operating at 0 dBm, a corresponding scheduling threshold T may be placed at about 10%. The above numbers are for FR1 and the corresponding estimations may be done for other frequency bands and technologies.

In one embodiment, the scheduling threshold Tis adjusted based on a UE output power. If the UE output power, or average output power, is increased, the scheduling threshold T is decreased. Correspondingly, if the UE output power, or average output power, is decreased, the scheduling threshold T is increased.

It should be emphasized that, although the focus of the disclosure is determining whether or not to buffer default beam bd for PDSCH reception, it may very well be expanded to also skip buffering any beams b1, b2, . . . , bn for PDSCH reception following the default beam bd. Typically, the UE may have sufficient processing power and memory to receive and decode the PDCCH of the default beam bd and thereafter receive and decode a PDSCH of a following beam without buffering. However, it may be beneficial to e.g. reduce the processing speed of the UE to further reduce power consumption which may imply that there would be a need to buffer beams following the default beam bd due to the increased PDCCH processing time. Therefore, in some embodiments, a probability that the PDSCH is scheduled in a beam following immediately after the default beam bd may be compared to a second scheduling threshold T2. If the probability that the PDSCH is scheduled in a beam following immediately after the default beam bd is below the second scheduling threshold T2, buffering of the beam following immediately after the default beam bd may be skipped. The same reasoning applies to a beam following immediately after the beam following immediately after the default beam bd and so on.

In one embodiment, the processing speed of the UE may be determined based on the probability that the PDSCH is scheduled in a beam following immediately after the default beam bd. If the probability that the PDSCH is scheduled in a beam following immediately after the default beam bd is below the second scheduling threshold T2, the processing speed of the UE is decreased, and if the probability that the PDSCH is scheduled in a beam following immediately after the default beam bd is at or above the second scheduling threshold T2, the processing speed is set to a default processing speed.

It should be noted that the scheduling thresholds T1, T2 as described herein may, in some embodiments be expressed as a scheduling offset threshold To. The scheduling offset threshold To will describe a threshold distance, in time or beams, from the default beam. A high scheduling offset threshold To indicate that the PDSCH will have to be scheduled comparably far from the default beam bd in order to be above the scheduling offset threshold To. When using the scheduling offset threshold To to determine is a buffering of the default beam bd for PDSCH reception should be skipped or not, the expected beam should be at or above the scheduling offset threshold To in order to reliably skip buffering of the PDSCH in the default beam bd.

Figure 6:
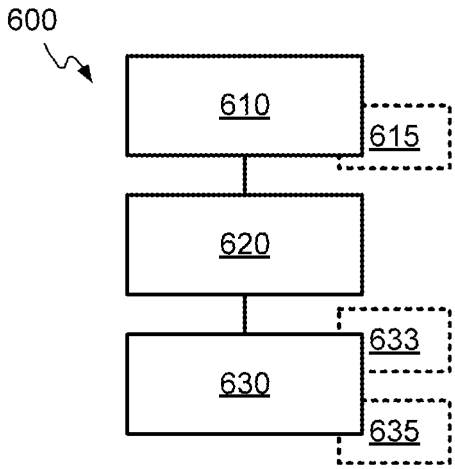
FIG. 6 is a schematic view of a method for skipped buffering according to some embodiments.

With reference to FIG. 6, a method 600 of skipped channel buffering according to some implementations will be explained. The method 600 is typically performed by a wireless device 100 (such as UE 100) configured to receive DL channel transmissions in multiple beams b1, b2, . . . , bn from a network node 200, or base station 200. The method 600 is can be reduced to practice for any number of beams greater than one.

The method 600 comprises the step of monitoring 610 a beam scheduling of the network node 200. The monitoring 610 may for example advantageously comprise recording the beam in which a PDSCH for the UE is scheduled. The monitoring 610 may lead to historic beam scheduling data such as that illustrated in FIG. 3, or may describe transitions as described with reference to FIG. 4. The historic beam scheduling data of the monitoring 610 may be stored in a memory of the UE 100 or may be summarized by means of e.g. the estimated mean $\bar{x}$ and the estimated standard deviation s together with the number n of historic beam scheduling data. If summarized data is stored, the monitoring 610 may preferably comprise updating the summarized data based on any new PDSCH beam scheduling data.

The method 600 further comprises determining 620, based on the historic beam scheduling data of the monitoring 610, a probability that a current DL channel transmission will be scheduled in the default beam bd. The current DL channel transmission will typically be the next PDSCH for the UE and the statistical tool used to describe how the probability is determined may be any suitable statistical tool or mechanism, but preferably the ones exemplified in this disclosure.

The determined 620 probability that the current DL channel transmission will be scheduled in the default beam bd is compared to a scheduling threshold T. If, or when, the probability that the current DL channel transmission will be scheduled in the default beam bd is at or below the scheduling threshold T, i.e. the probability that the current DL channel transmission will be scheduled in the default beam bd is comparably low, the step of skipping 630 buffering of the DL channel transmission, i.e. the PDSCH, of the default beam bd, is performed. If, or when, the probability that the current DL channel transmission will be scheduled in the default beam bd is above the scheduling threshold T, i.e. the probability that the current DL channel transmission will be scheduled in the default beam bd is comparably high, no skipping 330 of buffering the default beam bd is performed and consequently, the default beam bd is buffered for PDSCH reception.

As previously indicated, the method 600 may, in some embodiments include transmitting 635, or otherwise signaling, a NACK in response to a missed DL channel transmission, i.e. a missed PDSCH, if a true scheduling offset indicate that the PDSCH is scheduled in the default beam bd when buffering of the PDSCH in the default beam bd was skipped 330. The true scheduling offset is the actual scheduling offset, that is the scheduling offset indicated in the current PDCCH received 633 from the base station 200.

In some embodiments of the method 600, the monitoring 610 may further comprise monitoring 615 a signal quality of the default beam bd. If, or when, the signal quality of the default beam bd is at or below a signal quality threshold, buffering of DL channel transmissions in the default beam bd is skipped 630. If, or when, the signal quality of a particular beam is worse than the signal quality of other beams, the base station 200 may be configured to schedule DL channel transmissions in beams with better signal quality and consequently avoid beams with worse signaling conditions. The signal quality may comprise any measure suitable to estimate the signal quality of the default beam bd. It may for example comprise a channel quality of the PDCCH, a channel quality of the PDSCH of the default beam, etcetera. Metrics such as relationships between signals and carriers and noise and interferences, e.g. SNR, SINR, C/N, CIR etc.

In some embodiments, the network node 200 may be configured to inform the wireless device such as the UE 100 of a minimum scheduling offset, i.e. the minimum number of beams between the default beam bd and the beam scheduled to carry the PDSCH. This means that the UE, or the method 600 implemented therein, may be configured to skip 630 buffering of the default beam bd for PDSCH reception if the minimum scheduling offset is greater than, e.g. zero. Alternatively, the UE, or the method 600, may be configured to skip 630 buffering the default beam bd for PDSCH reception if the minimum scheduling offset is greater than a predetermined or configurable second scheduling threshold T2.

Figure 7:
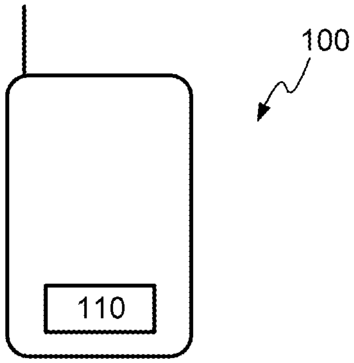
FIG. 7 is a schematic view of a wireless device according to some embodiments.

In FIG. 7, an example implementation of the wireless device 100 is shown. The wireless device 100 may comprise one or more controllers 110. Said one or more controllers of the wireless device 110 are preferably configured to perform the method 600 and/or any other features listed in this disclosure. In one embodiment, the wireless device 100 is a New Radio, NR, device.

Figure 8:
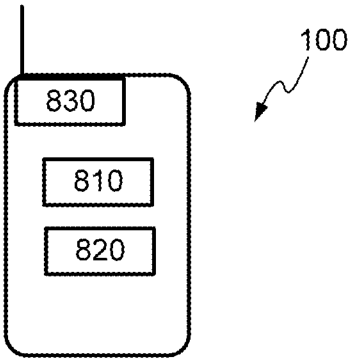
FIG. 8 shows an example implementation of a wireless devices, such as a UE.

FIG. 8 illustrates another example implementation of a wireless device 100, such as a UE. The wireless device 100 is configured to receive downlink, DL, transmissions in multiple beams b1, . . . , bn from a network node 200. The wireless device 100 also comprises a processor 810, a memory 820 and a communications interface 830 with transmission and/or reception capabilities. The memory 820 comprises instructions executable by the processor 810 whereby the wireless device is operative to: monitor 610 (see FIG. 6) a beam scheduling of the network node 200; determine 620, based on the monitoring 610, a probability that a current DL channel transmission is scheduled in a default beam bd, and responsive to the probability that the current DL channel transmission is scheduled in the default beam bd is at or below a scheduling threshold T, skipping 630 buffering of a DL channel transmission in the default beam bd. To this end, the wireless device 100 comprises a processor 810 and a memory 820, said memory comprising instructions executable by the processor 810 whereby the wireless device 100 is operative to perform the method 600 described in conjunction with FIG. 6.

Figure 9:
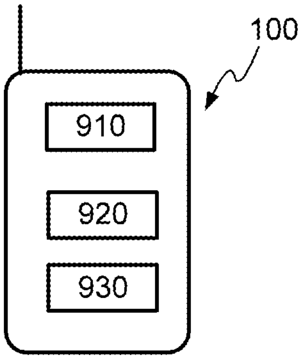
FIG. 9 shows another example implementation of a wireless devices, such as a UE.

FIG. 9 illustrates another example implementation of a wireless device 100, such as a UE. The wireless device 100 is configured to receive downlink, DL, transmissions in multiple beams b1, . . . , bn from a network node 200. The wireless devices comprises, among other things: means 910 adapted to monitor 610 (see FIG. 6) a beam scheduling of the network node 200, means 920 adapted to determine 620, based on the monitoring 610, a probability that a current DL channel transmission is scheduled in a default beam bd, and means 930 adapted to skip 630 buffering of a DL channel transmission in the default beam bd responsive to the probability that the current DL channel transmission is scheduled in the default beam bd is at or below a scheduling threshold T. Furthermore, the wireless device 100 may comprise additional means adapted to perform the various embodiments of method 600 described in conjunction with FIG. 6.

Figure 10:
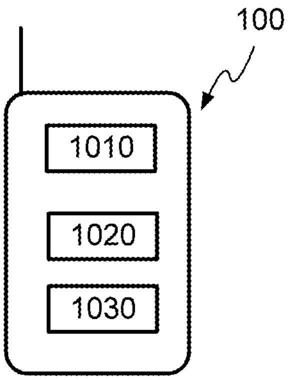
FIG. 10 shows still another example implementation of a wireless devices, such as a UE.

FIG. 10 illustrates another example implementation of a wireless device 100, such as a UE. The wireless device 100 is configured to receive downlink, DL, transmissions in multiple beams b1, . . . , bn from a network node 200. The wireless devices comprises, among other things: a first module 1010 adapted to monitor 610 (see FIG. 6) a beam scheduling of the network node 200, a second module 1020 adapted to determine 620, based on the monitoring 610, a probability that a current DL channel transmission is scheduled in a default beam bd, and a third module 1030 adapted to skip 630 buffering of a DL channel transmission in the default beam bd responsive to the probability that the current DL channel transmission is scheduled in the default beam bd is at or below a scheduling threshold T. Furthermore, the wireless device 100 may comprise additional module(s) adapted to perform the various embodiments of method 600 described in conjunction with FIG. 6.

Figure 11:
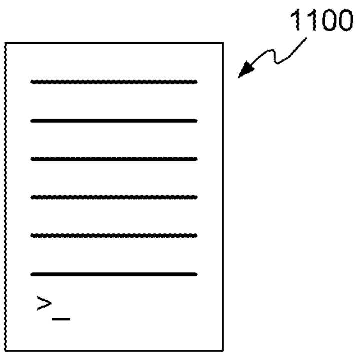
FIG. 11 shows an example implementation of a computer program product.

FIG. 11 is a schematic view of a computer program product 1100 according to one embodiment. The computer program product 1100 comprises instructions which, when executed on at least one processor 810 or controller 110 of the wireless device 100, cause the at least one processor 810 or controller 110 to carry out the method 600 and/or any other features listed in this disclosure.

Figure 12:
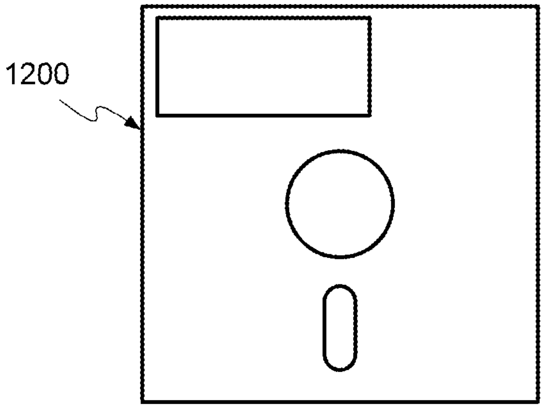
FIG. 12 shows an example implementation of a carrier for a computer program product.

FIG. 12 is a schematic view of a carrier 1200 according to one exemplary embodiment. The carrier 1200 comprises the computer program product 1100. The carrier 1200 may be any one of an electronic signal, an optical signal, a radio signal, or a computer readable storage medium.

Various Detailed Implementations

In the following, certain detailed example implementations of the various embodiments described hitherto will be disclosed.

A scenario is considered where the UE 100 is configured with multiple beams b1, b2, . . . , bn. The configuration may be e.g., through configuring a number of TCI states, e.g., M through RRC, and then activating N out of M TCI states through MAC CE for PDSCH. Furthermore, it is assumed that the one or more CORESETs within which the UE 100 monitors 310 PDCCH is configured with, in accordance with e.g. 3GPP TS 38.321, the higher layer paramter tci-PresentInDCI enabled, i.e., the UE 100 expects that the scheduling PDCCH indicate the beam out of N activated beams b1, b2, . . . , bn within which the UE 100 receives PDSCH. Additionally, a scheduling offset threshold To is configured for the UE 100 employing timeDurationForQCL. In case the scheduling offset is larger than or equal to the scheduling offset threshold To, the UE 100 expects the beam for PDSCH to be one out of N beams as indicated using a TCI bitfield within the scheduling PDCCH. In addition to this, if the scheduling offset is lower than the scheduling offset threshold To, the UE 100 knows that the PDSCH beam is the default TCI, i.e. the same beam as the PDCCH with the lowest CORESET ID in the same slot. In a default UE 100 operation, since the UE does not generally have an exact knowledge about the scheduling offset, i.e. in what beam the PDSCH will be scheduled, the UE 100 buffers PDSCH in the default beam bd, or TCI state, and upon decoding PDCCH and learning the true scheduling offset, the UE 100 will know the scheduled PDSCH beam based on the scheduling offset as well as the TCI bitfield content in the DCI. In case the scheduling offset is larger than the scheduling offset threshold To, then the UE 100 has to receive the PDSCH again in that specific beam, or even if the scheduling offset is lower than the scheduling offset threshold To, but larger than a second scheduling offset threshold To2, where the second threshold is smaller than the scheduling offset threshold To, the UE needs to buffer PDSCH again in the default beam bd.

In one embodiment of the present disclosure, the UE 100 skips buffering of PDSCH in the default beam bd at least in the same slot as it receives the scheduling PDCCH based on a criteria in the scheduling offset. The criteria may, in a general example, be an a priori knowledge of the UE 100 regarding the scheduling offset being larger than the second scheduling offset threshold To2. As previously disclosed, if the UE 100 can skip buffering PDSCH in the default beam bd, then the UE 100 can save power by avoiding unnecessary buffering of PDSCH in the default beam db, e.g., the UE 100 can turn off its RF receive chain to avoid buffering PDSCH. The second scheduling offset threshold To2 may be e.g. the amount of time the UE needs to decode the scheduling PDCCH and become aware of the scheduled k0 value, i.e. the scheduling offset. The second scheduling offset threshold To2 may be determined in terms of a number of slots, a number of symbols, or a measure of time, e.g. a fraction of milliseconds ms, or a number of milliseconds ms, etc. Furthermore, the second scheduling offset threshold To2 may be different for different Subcarrier Spacings, SCSs, e.g., for SCS of 60 kHz it may be 1 slot, but for SCS of 120 kHz 2 slots, and so on. In addition, the second scheduling offset threshold To2 may further depend on the location of the last symbol of the PDCCH. For instance, if the last PDCCH symbol is located in a symbol number larger than a specific value, e.g. 3, the UE 100 may increase the second scheduling offset threshold To2 by 1 slot.

In one example embodiment, the UE 100 may not have been explicitly indicated about the minimum scheduling offset neither through configuration nor through L1 signaling. The UE 100 may learn based on historical behavior of the network, NW, that the NW typically may schedule the UE 100 either constantly with a non-zero minimum scheduling offset value larger than the second scheduling offset threshold To2, e.g., 2 slots, or most of the time, e.g., more than a specific percentage of the time, e.g., 90% of the time. That is to say, the UE 100 notes that in the previous instances, e.g., the last 100 scheduled slots, the NW scheduled the UE 100 with a PDSCH through a DCI with the minimum scheduling offset being more than 2 in more than 90% of the cased. As such, the UE may decide to skip buffering PDSCH in the default beam bd in the same slot as it receives the scheduling PDCCH or the one after in this example, to save power by avoiding unnecessary buffering of PDSCH in the default beam bd. Should the UE 100 note, that as a result of this, the UE has missed the PDSCH, it may transmit a HARQ NACK, and further omit the underlying power saving mode, i.e. skipping to buffer the PDSCH in the default beam, and start buffering PDSCH in the default beam from the next occasion. In order to do so, the UE 100 may further decide to skip buffering PDSCH in the default beam bd based on additional criteria, e.g., a specific PDSCH BLER. The 90% of the time UE 100 being scheduled with a minimum offset larger than the second scheduling offset threshold To2 in the present example is chosen e.g. to avoid a large amount of HARQ NACKs.

In a similar way as the embodiments exemplified above, the UE 100 may additionally or alternatively learn from the NW scheduling history, e.g. how the NW has scheduled the PDSCH through DCI in the last 100 scheduled slots, and what was the scheduling offset in the DCI, that the NW schedules the UE 100 with a minimum SLIV value larger than the second scheduling offset threshold To2, e.g., 5 symbols in more than a specific percentage of the time, e.g., 90%. Again, the UE 100 may decide to skip buffering PDSCH in the default beam at least in the same slot as it receives the scheduling PDCCH in this case, and in case it has missed a PDSCH, a similar recovery mechanism as in the example above may be employed. That is to say, the UE 100 may transmit a HARQ NACK, and return to the normal mode by buffering PDSCH in the default beam db from the next occasion.

In addition to the methods described above, the UE may additionally or alternatively employ other criteria to skip buffering PDSCH in the default beam db. The UE 100 may be configured to learn, based on NW historical behavior, channel conditions in the beams, expected traffic in a beam e.g., Reference Signal Receive Power (RSRP), Reference Signal Received Quality (RSRQ), doppler, movement, etc., whether the NW is going to use not the default beam db or not for the PDSCH.

In one embodiment, the UE 100 notes that when the channel quality in the default beam is comparably good, e.g., RSRP or SINR is larger than the signal quality threshold, e.g., SINR larger than 10 dB, the NW keeps using the default beam bd for scheduling PDSCH, but when the channel quality goes below a specific level, e.g., RSRP or SINR falls below the signal quality threshold, the NW employs the other beams for the DL channel transmission of the PDSCH. As such, the UE 100 may decide to skip buffering PDSCH in the default beam bd, if the channel quality in the default beam goes below a specific level, and thus the UE 100 does not expect the NW to schedule the UE 100 in the default beam bd. The signal quality threshold may be determined e.g., based on the SINR and the expected traffic, i.e. the UE may be configured to determine if the expected traffic may be satisfied with a specific SINR, if so, the UE 100 be configured to use that as the signal quality threshold. The expected traffic may be for example in terms of a data bit rate that the UE 100 expects to receive over the default beam bd. In another example, the UE 100 notes that the NW substantially always or more than a specific percentage of the times, employ the beam with the highest RSRP, RSRQ, SINR, or other channel quality metrics. As such, the UE 100 may skip buffering the PDSCH in the default beam bd, in case the default beam bd is not the beam with the highest channel quality metric. E.g., the UE 100 measures receive a CSI-RS, and measures the channel quality in the configured beams, or the beams that it expects to receive PDSCH (i.e., those which are activated by the MAC layer). Then the UE 100 can measure what is the RSRP, RSRQ; or SINR of the channel in each of those beams, and report to the NW. Furthermore, the UE 100 may learn that, for example, more than 90% of the time, the NW schedules the UE with a PDSCH to be received in the highest reported SINR. As such, if the default beam bd is not the beam with the best channel quality, then the UE 100 decides to avoid buffering PDSCH in the default beam at least in the same slot as it receives the scheduling PDCCH.

In another embodiment, if the UE 100 is mobile, it may be in angular domain as well as mobile in a specific area, the UE 100 may be configured to not buffer PDSCH in the default beam bd, considering channel conditions are changing due to mobility and the default beam bd may not be the best one to schedule the UE 100 with. In a further embodiment, if the UE 100 notes that a doppler shift is higher than a specific threshold, or that a speed of the UE 100 is higher than a specific threshold, e.g., more than 100 km/h, the NW does not schedule the UE in the default beam bd, and instead schedules the UE in a beam indicated with the TCI field, e.g., the beam with the highest channel quality metrics. This may be the case when, e.g. the UE moves very fast through the beams, and consequently, the default beam bd may not always remain the best beam to schedule PDSCH for the UE 100.

In another embodiment, the UE 100 may be configured to note that the expected upcoming traffic cannot be handled by the default beam bd, i.e., the capacity in the default beam bd e.g., in terms of bits per seconds is not enough for the expected traffic, and thus skip buffering PDSCH in the default beam bd at least in the same slot as it receives the scheduling PDCCH. That is to say, the UE may be configured to note, considering the channel quality within a specific beam, that there is a specific traffic capacity being possible to handle by the beam, e.g., a download rate of 20 Mbps. However, the upcoming traffic may need a download rate of 100 Mbps which may not be handled by the default beam bd, and consequently the UE 100 expects that the NW would is unlikely to schedule the upcoming traffic in the default beam bd.

In one embodiment, the UE may be configured to skip PDSCH reception/buffering of the default beam if a link-related metric does not fulfill a condition, e.g., SINR being lower than 10 dB as described in other embodiments. In such a case, the UE 100 may be configured to determine the link quality of the default beam bd to not be good enough to accommodate the expected traffic and the associated data rate. Such a decision to skip buffering PDSCH in the default beam bd may be based on a “link budget” computation possibility made out of the combined effect of current propagation channel conditions as well as configured data reception parameters. For example, the UE 100 may track the default beam's channel quality over time, e.g. RSSI, and together with the configured PDSCH data reception parameters, e.g. MCS and others, it may be configured to determine if the default beam is, or is not, a reliable beam for PDSCH reception. That is to say, the UE may expect that the PDSCH MCS may be a higher value, e.g., a modulation of QAM 64, but the channel conditions in the default beam bd does not support more than a modulation of QAM 16, and thus, the NW is unlikely to schedule the PDSCH in the default beam bd.

In one embodiment historical NW behavior may be one or more of the following types in a given time period, e.g. the last scheduled 100 slots, or last 100 scheduling instances, NW scheduling behaviors with regard to cross-slot scheduling or scheduling with a non-zero SLIV value, NW scheduling behaviors with regard to changing channel conditions in the default beam, or NW scheduling behavior with regard to doppler or UE speed.

Modifications and other variants of the described aspects, embodiments and implementations will come to mind to one skilled in the art having benefit of the teachings presented in the foregoing description and associated drawings. Therefore, it is to be understood that the embodiments are not limited to the specific examples described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims.

The invention claimed is:

1. A method of skipped channel buffering performed by a wireless device configured to receive downlink, DL, transmissions in multiple beams (b1, . . . , bn) from a network node, the method comprising:

monitoring a beam scheduling of the network node, determining, based on the monitoring, a probability that a current DL channel transmission is scheduled in a default beam (bd), and responsive to the probability that the current DL channel transmission is scheduled in the default beam (bd) is at or below a scheduling threshold (T), skipping buffering of a DL channel transmission in the default beam (bd).

2. The method of claim 1, wherein determining the probability that a current DL channel transmission is scheduled in a default beam (bd) is based on scheduling offsets of a series of historic DL channel transmissions.

3. The method of claim 2, wherein determining the probability that a current DL channel transmission is scheduled in a default beam (bd) comprises calculating an average scheduling offset ($\bar{x}$) of the series of historic DL channel transmissions.

4. The method of claim 2, wherein determining the probability that a current DL channel transmission is scheduled in a default beam (bd) comprises calculating a scheduling standard deviation(s) of the scheduling offsets of the series of historic DL channel transmissions.

5. The method of claim 4, wherein determining the probability that a current DL channel transmission is scheduled in a default beam (bd) comprises calculating a scheduling confidence interval (CI) having a confidence interval width based on the average scheduling offset ($\bar{x}$) and the scheduling standard deviation(s).

6. The method of claim 1, further comprising:

receiving, from the network node, a DL control transmission comprising an indication of a true scheduling offset, and after the step of skipping buffering of DL channel transmissions in the default beam (bd) and responsive to the true scheduling offset indicating that the DL channel transmission is scheduled in the default beam (bd):

transmitting, to the network node, a negative acknowledgement, NACK, associated with the DL channel transmission scheduled in the default beam (bd).

7. The method of claim 1, further comprising monitoring a signal quality of the default beam and responsive to the signal quality being below a signal quality threshold, skipping buffering of DL channel transmissions in the default beam (bd), wherein the signal quality threshold is a threshold that relates to at least one of Signal-to-noise ratio, SNR, Signal-to-interference-plus-noise ratio, SINR, carrier-to-noise, C/N, carrier-to-interference ratio, CIR.

8. The method of claim 1, wherein the DL channel transmission is transmitted on a Physical Downlink Shared Channel, PDSCH.

9. The method of claim 1, wherein the beam scheduling is transmitted on a Physical Downlink Control Channel, PDCCH.

10. The method of claim 1, further comprising, responsive to the network node informing the wireless device of a minimum scheduling offset being greater than zero, skipping buffering of DL channel transmission in the default beam (bd).

11. The method of claim 10, wherein the minimum scheduling offset is indicated in a start symbol and length, SLIV, field transmitted by the network node on the PDCCH.

12. The method of claim 1, wherein the scheduling threshold (T) is determined based on decoding time required by the wireless device to decode the beam scheduling of the network node.

13. The method of claim 1, wherein the scheduling threshold (T) corresponds to a probability of 10 percent or less.

14. A wireless device, comprising one or more controllers configured to perform the method according to claim 1.

15. The wireless device of claim 14, wherein the wireless device is a New Radio, NR, device or later generations thereof.

16. A computer program product, comprising instructions stored on a non-transitory storage medium which, when executed on at least one processor of a wireless device, cause the at least one processor to carry out the method according to claim 1.

* * * * *